Figure 1:
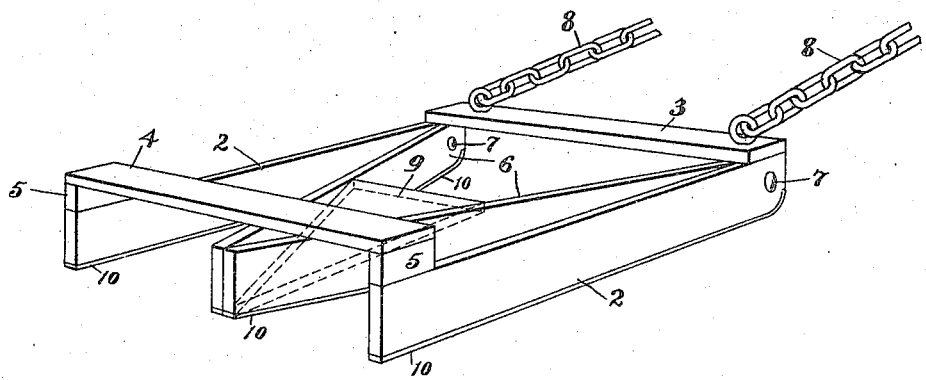
Figure 2:
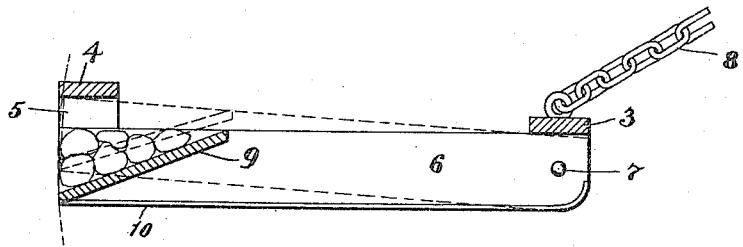

J. D. CLARKSON.
ROAD SCRAPING AND LEVELING MACHINE.
APPLICATION FILED APR. 13, 1915.

1,184,622.

Patented May 23, 1916.

UNITED STATES PATENT OFFICE.

JAMES D. CLARKSON, OF CARTHAGE, MISSOURI.

ROAD SCRAPING AND LEVELING MACHINE.

1,184,622. Specification of Letters Patent. Patented May 23, 1916.

Application filed April 13, 1915. Serial No. 21,034.

*To all whom it may concern:*

Be it known that I, JAMES D. CLARKSON, a citizen of the United States, residing at Carthage, in the county of Jasper and State of Missouri, have invented certain new and useful Improvements in Road Scraping and Leveling Machines, of which the following is a specification.

My invention relates to a machine for scraping and leveling road surfaces, and it has for its object to produce a machine of this kind that is very simple in construction and is adapted to be used for making the minor repairs that are required from time to time upon country roads. The machine is also adapted for other uses than that indicated, such as the leveling of fields in farming and gardening operations.

The accompanying drawing is a perspective view of a machine built according to the preferred form of my invention.

Referring to such drawing, 2, 2 indicate the side pieces of a supporting or drag frame. They are preferably parallel and in the form of runners adapted to slide upon the surface of the ground, though they might be wheel-supported without departing from the spirit of my invention. 3 indicates a cross piece connecting these side pieces near their front ends, and 4, a rear cross connecting piece. The latter is preferably raised above the top edges of the pieces 2, as by means of blocks 5.

The leveling and scraping frame is supported between the side pieces 2 of the drag frame just described. It consists of two side pieces, 6, 6, arranged to form a V-shaped frame, the apex of which is toward the rear and located below the rear cross piece 4 of the drag frame. The free diverging ends of the leveling frame are united with the drag frame by bolts or pivots 7, 7, upon which the leveling frame is free to swing.

9 indicates a triangular plate located in the vertex of the angle bounded by the side pieces 6 of the leveling frame. This plate inclines downwardly from front to rear and its front edge is about level with the upper edges of the side pieces 6 while its rear end or apex terminates in the plane of the lower edges of the said side pieces. It is secured fast to the side pieces 6, and operates as a shield to prevent the material that may be collected by the side pieces of the leveling frame and thereby directed toward the apex thereof, from escaping upwardly, and causes the leveling frame to pass over it as the machine is drawn forwardly. The plate 9 also serves as the bottom of a receptacle at the rear, apex end of the leveling frame in which may be placed and retained weights, such as stones, for increasing the pressure of the frame upon the surface being acted upon, and hence increasing its effectiveness as a scraping and leveling instrument.

The lower edges of the side pieces of the leveling frame are preferably shod with metal, as indicated at 10. Power is applied to drag the machine forward through draft devices 8. As the leveling frame moves over the surface the lower scraping edges of the side pieces 6 thereof operate to remove the ridges and humps of the surface, the material so removed being directed toward the center of the frame and below the plate or board 9. This, coöperating with the contiguous side frame pieces, operates to press the material downward, causing it to fill depressions that may be in the surface and compressing it therein. As has been intimated, the scraping and leveling action of the machine can to a degree be regulated by increasing the weight of the leveling frame, as by placing weights in the receptacle formed above the plate 9. As will be seen, the rear end of the leveling frame is floating or free to move upward and downward, and, when the machine is in use, is constantly thus moving, automatically accommodating itself to the surface conditions of the roadway or field over which it is being operated. It sometimes happens that a clod of earth of large size and considerable rigidity will be dislodged by the side pieces 6 of the leveling frame and will pass under the plate 9. Unless it is by the weight of the frame here broken it will lift the frame as the latter passes over it until the upper edge thereof comes into engagement with the lower surface of the cross piece 4 of the main supporting or drag frame. This will tend to stop the further elevation of the leveling frame, and will add the weight of the drag frame thereto, with the result that such clod or mass of material will be broken, if it is of a nature that may be crushed by the machine. Otherwise the whole machine will be lifted as it passes over the obstruction, and this will serve to direct the attention of the operator to the fact that a rock or stone of a size that should be removed from the roadway or be broken by hand has been encountered.

What I claim is:—

The combination of a supporting frame, a V-shaped scraping and leveling frame, its forward broad end being pivoted to the supporting frame leaving its rear end free to rise and fall, a portion of the supporting frame being located above the rear floating end of the leveling frame in position to be engaged thereby when the leveling frame is lifted to an unusual extent whereby the weight of the supporting frame is added to the weight of the leveling frame.

JAMES D. CLARKSON.

Witnesses:
H. L. SHANNON,
LAURA HOBBS.

Copies of this patent may be obtained for five cents each, by addressing the "Commissioner of Patents, Washington, D. C."